Figure 1:
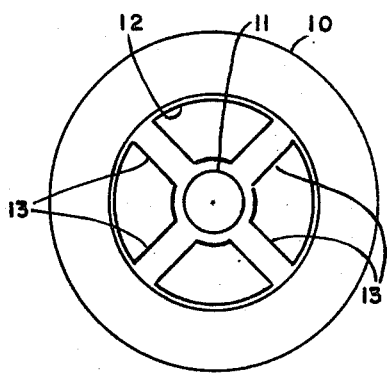

United States Patent
Howe

[15] 3,702,568
[45] Nov. 14, 1972

[54] GYROSCOPES AND SUSPENSIONS THEREFOR

[72] Inventor: Edwin W. Howe, 1150 McDonald Place, North Baldwin, N.Y. 11510

[22] Filed: July 10, 1970

[21] Appl. No.: 53,963

[52] U.S. Cl. .................................. 74/5, 74/5.4
[51] Int. Cl. ................................... G01c 19/02
[58] Field of Search .......... 74/5, 5.4; 308/2 A; 64/15; 73/505

[56] References Cited

UNITED STATES PATENTS

| | | | |
|---|---|---|---|
| 3,452,608 | 7/1969 | Stiles | 74/5 |
| 3,559,492 | 2/1971 | Erdley | 74/5 X |
| 3,354,726 | 11/1967 | Krupick et al. | 74/5 |
| 3,301,073 | 1/1967 | Howe | 74/5 X |
| 3,515,006 | 6/1970 | Duck | 74/5 |
| 3,538,776 | 11/1970 | Macor et al. | 74/5 |
| 3,543,301 | 11/1970 | Barnett | 74/5 |

Primary Examiner—Manuel A. Antonakas
Attorney—Arthur S. Haapaniemi

[57] ABSTRACT

A sensitive element support for gyroscopic apparatus including an outer wheel connected to a drive shaft by flat transversely stiff elastic spokes having an effective plans parallel to the wheel, and an intermediate gimbal ring connected to the wheel by diametrically opposite flat, transversely stiff, torsional members having their flat plane normally perpendicular to the plane of the wheel, and connected to the shaft by similar members spaced 90° away from the first torsinal members. Construction is simplified by making all connecting members in a single operation out of a flat sheet so as to leave the spokes and the other flat torsinal members between appropriate portions on which the outer wheel, gimbal ring and driving coupling will be attached. The torsinal members are then twisted to their final configurations, i.e., perpendicular to the sheet from which they were cut, and the flat sheet is sandwiched between two halves of the outer wheel, gimbal ring and hub portion. The completed assembly resembles a "cartridge" which, by its nature, has definite advantages in the initial fabrication and maintenance of the gyroscopic instruments using the "cartridge" to support the gyroscopic rotor.

14 Claims, 8 Drawing Figures

PATENTED NOV 14 1972 3,702,568

INVENTOR
EDWIN W. HOWE
BY Arthur J. Haapamieni
AGENT

GYROSCOPES AND SUSPENSIONS THEREFOR

BACKGROUND AND SUMMARY

The present invention relates to gyroscopes and has particular reference to a non-floated two-degree-of freedom suspension system therefor.

I have described in detail the construction and operating theory of a particular gyroscope known as a dynamically tuned free gyro in my U.S. Pat. No. 3,301,073 for Gyroscope Apparatus which was issued on Jan. 31, 1967. It is described therein how the intermediate gimbal's inertia characteristics served to produce a speed sensitive "antispring" effect which was used to compensate for the inherent spring coupling of the suspension, or vice-versa, how added spring coupling assisted in minimizing the reaction forces which the intermediate gimbal inertia tended to produce on the rotor in the usual universal joint.

In the dynamically tuned gyroscope the gyro rotor is suspended in a universal joint, including a gimbal ring, in which both sets of pivots (between the rotor and gimbal and between the gimbal the drive shaft) possess elastic restraint. The gyro wheel is made truly free by rotating the shaft at a particular speed, known as the resonant speed, at which speed the elastic restraints acting on the rotor are reduced to zero. Briefly, it can be shown that the overall spring constant, K, applied to the gyro rotor may be expressed as $$K = k - (a - c/2) w^2$$

when $k =$ elastic restoring torque rate developed by the torsion pivots of the suspension.

$a =$ moment of inertia of the gimbal ring in the equatorial plane, $c =$ moment of inertia of the gimbal ring along the spin axis, and $w =$ angular spin rate It will be seen that at the resonant speed the reaction torque rate $(-(a-c/2) w^2)$ is equivalent to a negative restoring torque which exactly cancels the elastic torque rate k of the suspension.

The practical application of the theoretical concepts involved could be achieved only with attention to extreme precision in manufacture and assembly of parts resulting in a relatively expensive, albeit well performing gyroscope. The present invention seeks to make use of spring constrained pivots in a universal coupling and to achieve these characteristics through simple, low-cost techniques. The five basic requisites or functions of the suspension in a dynamically tuned gyroscope are:

1. to transmit rotational torques to the gyro rotor from a rotating drive shaft,
2. to support the gyro rotor so as to maintain the center of the rotor at the established point of rotation under external axial and radial loads,
3. to permit frictionless angular offset of the gyro rotor about the established point of rotation,
4. to provide frictionless spring coupling which tends to restore an offset gyro rotor to a plane normal to the axis of rotation (drive shaft), and
5. to provide an inertia element for generating an antispring effect which compensates for the spring coupling.

Previous attempts to satisfy the preceding requisites have been based on relatively complicated pivot systems which require critical machining and precision assembly techniques. In concept, my new gyro includes a gyro wheel connected to a driving shaft by a plurality of flat ribbons or spokes lying in the plane of the wheel. These spokes establish the necessary radial restraint and transmit the torques necessary to rotate the gyro wheel yet permit angular offset with respect to the drive shaft. Axial restraint is established by two pairs of flat ribbon members lying perpendicularly to the plane of the wheel, one pair between the shaft and an intermediate gimbal ring and the other pair 90° away connected between the intermediate gimbal ring and the gyro wheel. The spokes satisfy conditions (1), part of (2), (3) and (4) above; the perpendicular ribbon members satisfy the remainder of conditions (2), (3), and (4); and the gimbal ring satisfies condition (5).

In a particularly advantageous construction I use a web-like diaphragm or skeletal disk which is manufactured from flat stock spring material whose thickness and characteristics can be easily controlled as the heart of the suspension. The diaphragm is cut out by any suitable means so as to include in one integral piece, the following: an outer annulus, an inner portion, a plurality of spokes connecting the annulus to the hub, land portions between the spokes, a pair of diametrically opposite, radially extending members connected between the hub and two of the land portions, and another pair of diametrically opposite, radially extending members connected between the annulus and two of the land portions at points 90° away from the first pair. The two pairs of radially extending members are twisted to be perpendicular to the plane of the diaphragm, the outer annulus is sandwiched between two halves of an outer ring, the land portions are sandwiched between two halves of an intermediate gimbal ring and the inner portion is sandwiched between two halves of a hub structure. This composite structure, with appropriate means for attaching it to a driving shaft will be described further and will be referred to as a "cartridge."

DRAWINGS

Figure 2:
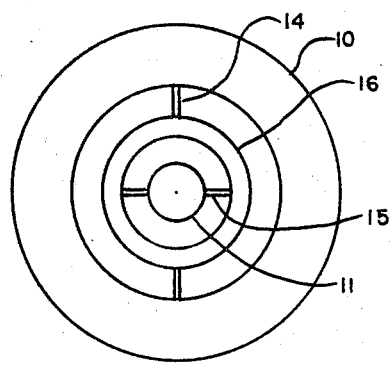
Figure 3:
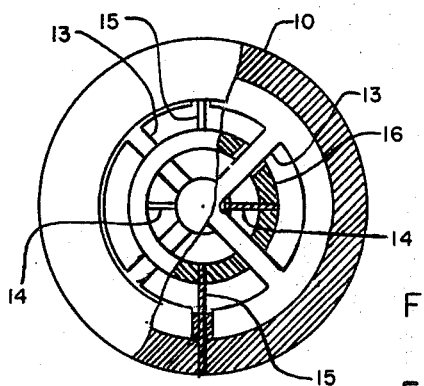
Figure 4:
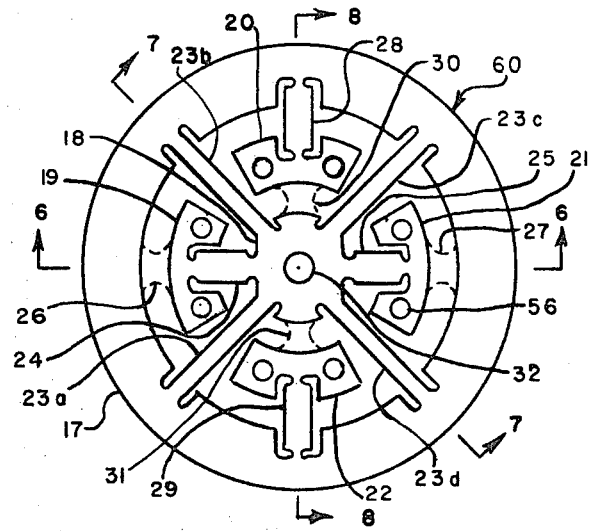
Figure 5:
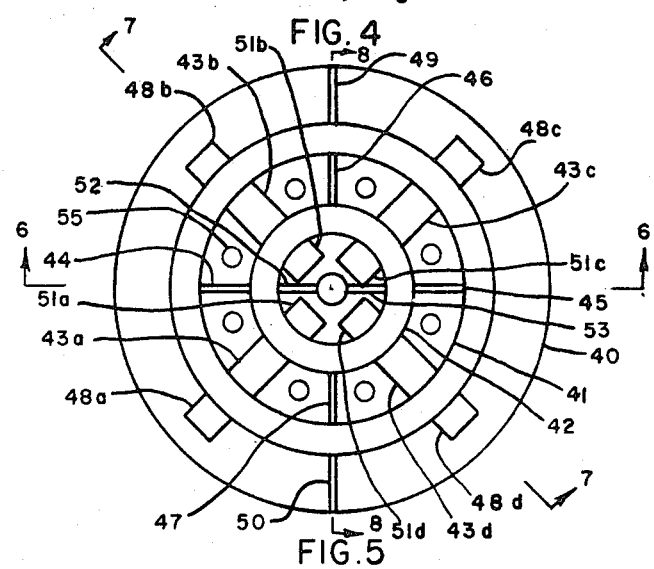
Figure 6:
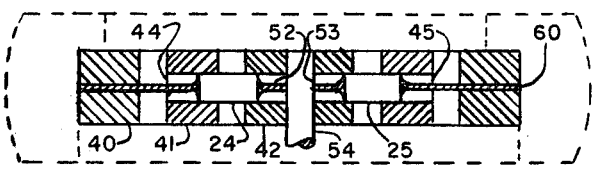
Figure 7:
Figure 8:
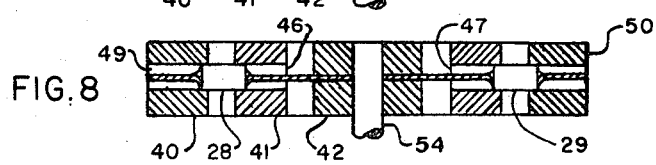

For a more complete understanding of this invention reference may be had to the accompanying diagrams, in which FIG. 1 is an explanatory diagram for explaining of one feature of the suspension, FIG. 2 is an explanatory diagram for explaining of another feature of the suspension, FIG. 3 shows a suspension combining the features of FIGS. 1 and 2, FIG. 4 is a plan view of the skeletal diaphragm in one stage of fabrication, FIG. 5 is a plan view of the lower halves of the inertia wheel, the gimbal ring and the hub, FIG. 6 is a cross sectional view of an assembled cartridge with the cutting plane passing through line 6—6 of FIGS. 4 and 5, FIG. 7 is a cross sectional view of an assembled cartridge with the cutting plane passing through line 7—7 of FIGS. 4 and 5, and FIG. 8 is a cross sectional view of an assembled cartridge with the cutting plane passing through line 8—8 of FIGS. 4 and 5.

DESCRIPTION

The concept of and the theory supporting the new gyro suspension can best be explained by a step by step build up of the suspension requirements. Thus, the initial requirement of the suspension is to support the gyro rotor without permitting displacement in the radial or axial directions. Considering first the support denying displacement in radial direction, the simplest type of support is found in a diaphragm of radial spoke elements. FIG. 1 shows a wheel 10 connected to a drive shaft 11 by means of a web like diaphragm or disk 12 having four mutually perpendicular spokes 13 extending radially between the shaft 11 and wheel 10. It should be realized that the diaphragm must contain at least three spokes, and that although four spokes are shown in FIG. 1 this number has been chosen as illustrative of the most logical embodiment but should not be considered limiting. The diaphragm 12 is made of relatively flexible material which permits the gyro wheel 10 to deflect angularly with respect to shaft 11, but has sufficient strength to maintain the wheel 10 concentric with the axis of shaft 11 at all times under external loads in the radial direction.

Due to the stiffness of this arrangement in the rotational direction, which is assured by adequate width of the spokes 13, the spokes 13 provide the means for transferring rotational energy from the shaft 11 to the wheel 10. However, this suspension alone does not provide the constraint along the drive axis which is required to keep the center of rotation fixed in the axial direction.

FIG. 2 illustrates how the axial constraint is achieved through the use of flat spring strips 14, 15 connected between the rotor 10 and a gimbal ring 16 and between the gimbal 16 and shaft 11 respectively. The plane of flat springs 14, 15 is nominally perpendicular to the plane of the rotor 10. The use of the intermediate gimbal ring 16 permits angular displacement of the gyro wheel 10 out of the plane normal to the shaft 11 about any diametral axis by twisting strip 14 or 15 or both. In the absence of the gimbal ring 16 the requisite angular freedom, of course, would not be achieved, i.e., if the strips 14, 15 were connected directly between shaft 11 and rotor 10.

A combination of the suspension shown in FIGS. 1 and 2 as illustrated in the partial section, FIG. 3, satisfies all the functional requisites noted earlier. Tapes 13 pass through apertures 16a in the gimbal ring 16 from shaft 11 to outer ring 10. The clearance in the apertures is sufficient to permit the gimbal ring 16 to assume any angular attitude (within limits) with respect to the shaft 11 and the outer ring 10 without touching the tapes 13. As in FIG. 2, the gimbal ring 16 is connected to shaft 11 by flat springs 14 and to outer ring 10 by flat springs 15.

In an alternative arrangement, not shown, two sets of tapes 13 are used, each set defining a cone having its apex at shaft 11 and the base at the wheel 10. The base of one cone is above the central plane of wheel 10 and the base of the other cone is equidistantly below the central plane thereby providing a support having the effect of spokes in the central plane. The gimbal ring 16 is suspended by springs 14, 15 between the two sets of tapes 13 in the central plane of the wheel 10. Thus, the necessary radial and axial load carrying capability is provided and an effective point of suspension is established in the central plane of the gyro about which the gyro wheel has angular freedom. The nature of the suspension is a pure spring system with no friction, back-lash or play. Finally, the intermediate gimbal ring provides the inertia means for generating the dynamic "anti-spring" which at a specific rotational speed cancels the effects due to the spring coupling between the gyro rotor and the drive shaft.

It should be noted also that the radial and axial elements are independent. Each may be designed to have equal angular spring characteristics, equal load carrying capacity or to achieve equal radial and axial stiffness. This latter consideration permits an isoelastic suspension to be designed so as to reduce the "$g$" induced drift sensitivity.

In considering the marriage of the suspensions of FIGS. 1 and 2 into an integral element, attention was paid specifically to developing an embodiment which would be economical to manufacture and reduce gyro assembly time to a minimum yet result in a gyro of the precision class. Although many designs based on the combination of FIGS. 1 and 2 are possible, the design shown in FIGS. 4 through 8 represents the preferred embodiment at this time. The novel design is based on the use of a single flat sheet of standard spring material out of which all the suspension elements are formed by stamping, engraving or etching, and twisting or shaping as will be described.

With reference now to FIG. 4 there is shown the membrane or skeletal disk 60 which constitutes the heart of the suspension. The disk 60 is preferably chemically etched out of a 3–5 mil sheet of a material such as ELGILOY. The disk 60 includes an outer annulus 17 and a central hub portion 18 with four intermediate lands 19, 20, 21, 22 between them. The central hub 18 is connected to the outer annulus 17 by four mutually perpendicular radial spokes 23a, b, c, d. Two diametrically opposite land areas 19, 21 situated between spokes 23a, b and between spokes 23c, d respectively are connected to the hub area 18 by respective radially extending members 24 and 25, and to the annulus 17 by webs 26 and 27. The other two diametrically opposite land areas 20, 22 are connected to the annulus 17 by radially extending members 28 and 29, and to the hub 18 by webs 30, 31 respectively. The regions of the hub, lands and annulus adjacent to the members 24, 25, 28 and 29 and spokes 23 are cut away so as to furnish extra length for those members. Additionally, the width of members 24, 25, 28 and 29 at the juncture with the hub or the annulus may be necked down to some degree as will be explained. The hub 18 is provided with central hole 32 which is used for assembly and balancing purposes, while the intermediate lands 19, 20, 21 and 22 are each provided with two holes 56 which are used for inertia "tuning" at the suspension as will be described. After the disk is cut out, the flat radially extending members 24, 25, 28 and 29 are twisted so that the plane of each member is substantially perpendicular to the plane of the disk 50. The undercut portions at either end of the members 24, 25, 28 and 29 which may not be absolutely essential, are desirable from the viewpoint of facilitating the twisting of the members and diminishing the possibility of distorting the disk.

FIG. 5 is a plan view of the lower halves of the outermost ring 40 of the suspension cartridge, intermediate gimbal ring 41 and the hub 42 shown in their relative operating positions. The skeletal structure of FIG. 4 is placed over the lower halves of the outer ring, gimbal and hub of FIG. 5 and mating upper halves of the wheel, gimbal and hub are placed over the web to form the complete suspension. FIGS. 6, 7 and 8 are cross sectional views of the assembled suspension taken along the line 6—6, 7—7 and 8—8 of FIGS. 4 and 5.

Referring now to FIGS. 5, 6, 7 and 8, each half of the gimbal ring 41 is designed with four shallow transverse grooves 43 a, b, c, d to provide clearance for the radial spokes 23 a, b, c, d. Furthermore, each half of gimbal ring 41 is designed with transverse slots 44, 45 which accept and hold the ends of the twisted radial members 24 and 25 and with similar slots 46, 47 which accept and hold the ends of the twisted radial members 28, 29.

Likewise, the outer ring 40 is provided with recesses 48 a, b, c, d to provide clearance for the ends of spokes 23 a, b, c, d, (which extend beyond the inner edge of the ring) slots 49, 50 which accept and hold the ends of twisted members 28 and 29. Also, the hub 42 is provided with recesses 51 a, b, c, d, for spokes 23 a, b, c, d and slots 52, 53 for the ends of twisted members 24, 25. The recesses 48 and 51 permit extended length spokes to be used for increased flexibility of the diaphragm.

Referring specifically to FIGS. 6 and 8 it will be seen that the radial members 24, 25, 28 and 29 have been twisted through 90° to be perpendicular to the plane of the wheel and gimbal ring. By twisting these members in this manner and capturing the ends of the tapes in the slots 45–47 and 49, 50, 52 and 53 with adhesive, the axial stiffness required to keep constant the center of rotation of the outer wheel 40 is achieved. It should be noted that the twist imparted to members 24 and 28 is preferably opposite to that imparted to members 25 and 29 respectively to reduce the possibility of introducing anomalies into the operation of the gyroscope.

For registration or alignment of the elements during assembly. the hub 42 is provided with a centrally located hole 32. The intermediate gimbal elements are automatically aligned by the effect of slots 44, 45, 46, 47 as they engage the members 24, 25, 28 and 29. The outermost ring 40 may be aligned with respect to the central hole 32 in the hub 42 in a simple fixture which holds the hub 42 and ring 40 in a concentric relationship during assembly.

Thus, as the skeletal structure of FIG. 4 is placed over the lower mechanical elements of FIG. 5 and similar upper mechanical elements (seen in FIGS. 6, 7, 8) are placed over the skeletal structure in the board nest alignment fixture, registration and alignment is obtained with a minimum of assembly problems.

The assembly of the gyroscope is further simplified by the existence of the temporary webs 26, 27, 30 and 31 since the webs maintain integrity and alignment of elements within the suspension during assembly operations. Initially, the upper and lower halves of the gimbal ring 41 and hub section 42 are assembled to the appropriate portions of the skeletal structure 50 with the twisted radial members 24, 25, 28 and 29 perpendicular to the plane of structure 50, fitted into the appropriate slots. Nominally the halves of the gimbal ring 41 are of equal thickness so that the center of the suspension is established at the center of the structure 60 without special assembly considerations. The lower and upper halves of the outer ring 40 is next assembled to the annulus 17, again maintaining alignment in the assembly fixture as described above, and fitting the ends of the radial members 28, 29 in the appropriate slots, again maintaining the center of suspension at the center of the structure 60 since both halves of the outer ring 40 are also equal in thickness. The elements of the suspension are all joined together preferably with an adhesive although other methods such as brazing may be used. The strips 24, 25, 28 and 29 must be securely held in the appropriate slots, e.g., by the adhesive, to preclude flexing at the twisted ends.

The assembled ring 40, gimbal ring 41, hub section 42 and structure 60 constitute a cartridge which can be handled without extreme caution at this time since the webs 26, 27, 30 and 31 prevent deflection of the outer ring 40 and gimbal ring 41 with respect to the hub 42. When additional inertia is required in the outer ring 40, a gyroscope inertia wheel may be attached to the outer ring 40 of the suspension cartridge as shown by the dotted outline in FIG. 6.

This cartridge also possesses an advantage in accomplishing the balancing which is required for precision operation. It will be noted that the webs 26, 27, 30 and 31 prevent angular freedom of the ring 40 with respect to the drive shaft 54 to which the hub member 42 is attached. This fact is used during balancing of the gyro to transmit the dynamic unbalance reactions to the shaft 54 and thereby to the balancing machine. In the usual types of free gyro suspension systems, these forces cannot be sensed and therefore more complex means of sensing unbalance is required. After balancing is accomplished, by means well established in the art, the webs, 26, 27, 30 and 31 are removed, with a fine file or engraving operation for example, to give the gyro the three degrees of freedom. The relatively small mass which is removed will not significantly affect gyro operation.

The gimbal ring 41 is provided with threaded weight adjustment screws (not shown) which may be inserted in the tapped holes 55 of the gimbal ring 41 and the holes 56 of the lands in structure 60 to increase or decrease the inertia effect. This adjustment is necessary in order to be able to achieve compensation for the spring coupling effect of the suspension at the designed operating speed as pointed out in my previously referenced U. S. Patent. For gross variations related to a major change in the designed operating speed, for example, additional ring weights may be attached to both faces of the gimbal ring 41.

While the invention has been described with reference to specific embodiment thereof, it will be understood that it may be embodied in many diverse forms without departing from the scope of the invention as defined by the appended claims.

I claim:

1. In a gyroscopic device, a hub, an outer wheel, a gimbal ring,
   a plurality of ribbon-like spokes extending between said wheel and said hub,
   the plane of said spokes being parallel to the plane of said wheel, a first pair of flat ribbon members diametrically opposite each other extending radially between said gimbal ring and said hub, a second pair of flat ribbon members diametrical opposite each other extending radially between said gimbal ring and said outer wheel and displaced 90° from said first pair of flat ribbon members, the planes of said first and second pairs of flat ribbon members being substantially perpendicular to the plane of said wheel.

2. The device as described in claim 1 in which said gimbal ring includes a passageway for each of said spokes.

3. A device as described in claim 1 including driving means connected to said hub for rotating said hub and to thereby rotate said wheel.

4. A device as described in claim 3 including an inertia wheel carried by said outer wheel.

5. A device as described in claim 4 wherein said driving means rotates said hub at a speed which minimizes the reaction forces of the suspension on said inertia wheel to thereby minimize the precession of said wheel.

6. In a gyroscope, a suspension including an outer ring, a hub, a gimbal ring, and an integral skeletal disk having an annular rim portion, a central portion, a plurality of spokes connected to said central and rim portions, a plurality of land portions situated between said spokes and interposed between said rim and central portions, first diametrically opposite radially extending members connected to said central portion and two of said land portions, second diametrically opposite radially extending members connected to said annular rim and to two of said land portions and located 90° away from said first pair of members, said outer ring being attached to said annular rim, said gimbal ring being attached to said land portions, and said hub being attached to said central portion.

7. A device as described in claim 6 in which the planes of both pairs of radially extending members are perpendicular to the plane of said disk.

8. A device as described in claim 7 in which the outer ring comprises two similar layers sandwiching the annular rim portion of said disk, the gimbal ring comprises two similar layers sandwiching the land portions of said disk, and the hub comprises two elements sandwiching the central portion of said disk.

9. A device as described in claim 7 in which the gimbal ring has apertures through which pass the spokes of the skeletal disk.

10. A device as described in claim 8 in which said gimbal ring layers and said hub elements include first aligned transverse slots, the ends of the first of said pairs of radially extending members being held fast in said slots, said gimbal ring layers and said outer ring layers having second aligned transverse slots, the ends of the second of said pairs of radially extending members being held fast in said second slots.

11. A device as described in claim 6 including a heavy wheel mounted on said outer ring to increase the inertia thereof.

12. A device as described in claim 9 including means for driving said hub to thereby rotate said heavy wheel.

13. A device as described in claim 12 wherein the speed of said driving means is maintained at a value which minimizes precession of said heavy wheel.

14. A device as described in claim 6 in which said disk includes a first pair of temporary webs connecting said central portion to said land portions along the diameter defined by said second pair of radially extending members, and a second pair of temporary webs connecting said land portions to said outer annular portion along the diameter defined by said first pair of radially extending members, whereby the outer ring, gimbal ring and hub are held in fixed relationship until said webs are removed.

* * * * *